US009740598B1

(12) United States Patent
Gebhard

(10) Patent No.: US 9,740,598 B1
(45) Date of Patent: Aug. 22, 2017

(54) LIVE TESTING OF APPLICATIONS BASED UPON A DEBUG KEYSTORE

(71) Applicant: Amazon Technologies, Inc., Seattle, WA (US)

(72) Inventor: Derek Steven Gebhard, Huntington Beach, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/739,838

(22) Filed: Jun. 15, 2015

(51) Int. Cl.
*G06F 11/36* (2006.01)
*G06F 9/445* (2006.01)
*H04L 9/32* (2006.01)

(52) U.S. Cl.
CPC ...... *G06F 11/3688* (2013.01); *G06F 11/3692* (2013.01); *H04L 9/3247* (2013.01)

(58) Field of Classification Search
None
See application file for complete search history.

(56) References Cited

U.S. PATENT DOCUMENTS

| 5,621,201 A * | 4/1997 | Langhans | G06Q 20/04 235/380 |
| 2002/0078380 A1* | 6/2002 | Lin | G06F 21/10 726/28 |
| 2006/0281440 A1* | 12/2006 | Minear | G06F 9/468 455/410 |
| 2012/0179907 A1* | 7/2012 | Byrd | H04L 9/3268 713/156 |
| 2015/0347970 A1* | 12/2015 | Kirtane | G06F 8/60 717/103 |

OTHER PUBLICATIONS

"FAQs-Amazon Apps & Services Developer Portal", Internet article, Jan. 5, 2011.*
"Amazon Apps & Services Developer Portal" (hereinafter "Amazon") with Pub. Date Jan. 5, 2011, unknown author.*

* cited by examiner

*Primary Examiner* — Daxin Wu
(74) *Attorney, Agent, or Firm* — Lee & Hayes, PLLC

(57) ABSTRACT

Technologies are disclosed herein for providing live testing of applications based upon a debug keystore. An application developer develops an application and registers with an application store. A public portion of a debug keystore may be used to generate a digital signature to sign the application in order to allow for live testing of the application at the application store with respect to various components of the application. In this way, live testing can occur without the need for publication and approval of the application by the application store. Additionally, use of the debug keystore may allow for live testing of the application to occur without the application developer incurring in-application purchase fees.

20 Claims, 7 Drawing Sheets

LIVE TESTING OF APPLICATIONS BASED UPON A DEBUG KEYSTORE

BACKGROUND

Application stores (which are commonly referred to as "app stores") typically provide functionality for allowing customers to browse and obtain applications for a fee or for free. For example, and without limitation, an application store might enable a customer utilizing a smartphone or tablet computing device to browse and obtain various types of applications that are suitable for use on the customer's particular type of computing device. Applications available through an application store may be provided by the operator of the application store or by third-party application developers.

Generally, third-party application developers are interested in testing of the third-party application developers' applications upon completion of the applications. However, operators of application stores may make the third-party developers publish their applications for approval by the operators in order to have the applications tested. During the publication of the applications, the applications are tested by the operators. This can be a long process before any results are obtained for debugging of the applications. Many times, the third-party application developers' are primarily interested in live testing of the applications, i.e. how do the applications perform when executed with respect to various aspects of the applications store such as, for example, in-application purchases, digital rights management, etc. Thus, it can be frustrating for the third-party application developers to wait for test results from the publication process in order to debug the applications.

The disclosure made herein is presented with respect to these and other considerations.

DETAILED DESCRIPTION

Figure 1:
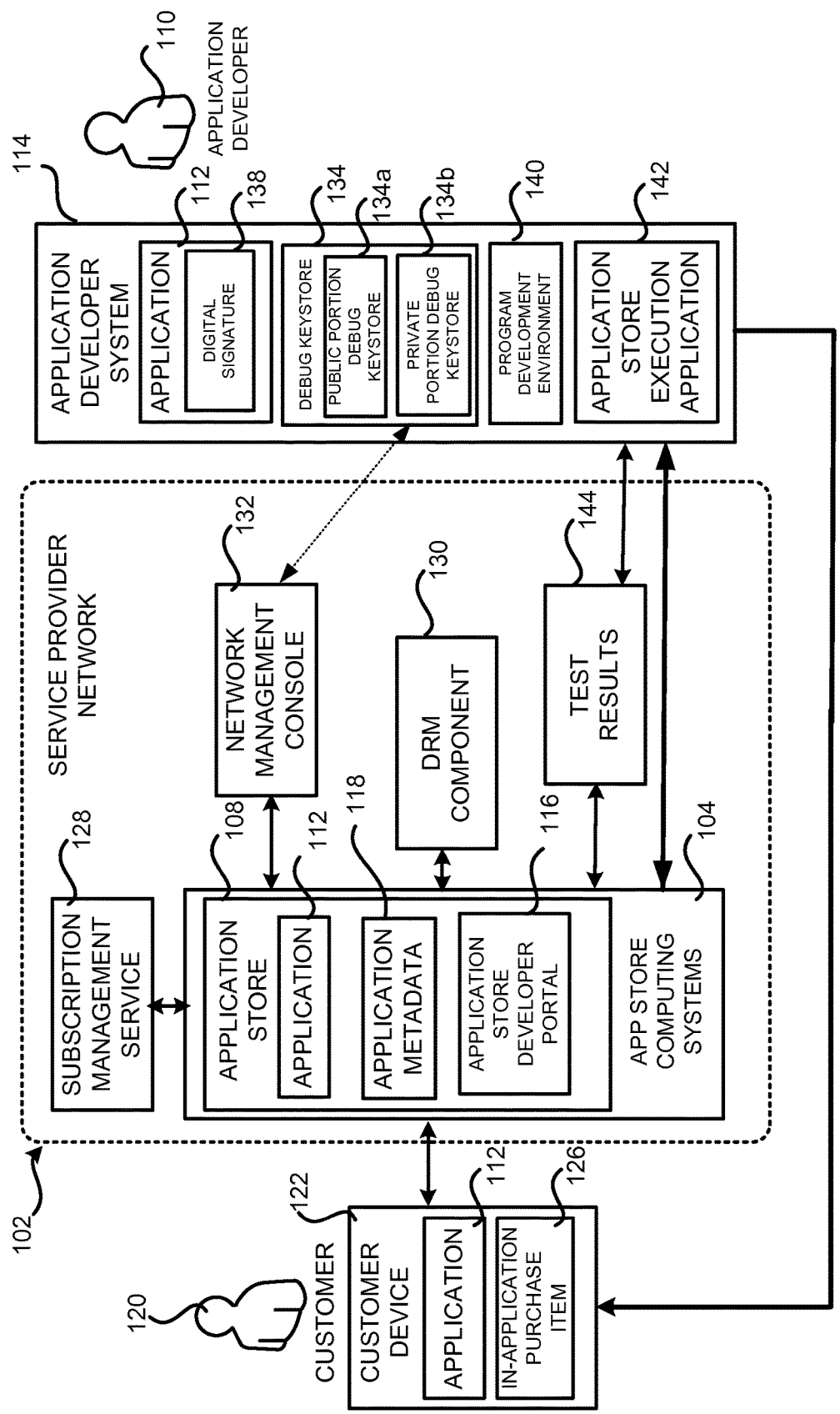
FIG. 1 is a system architecture diagram showing aspects of the configuration and operation of several components described herein for providing live testing of applications based upon a debug keystore.

The following detailed description is directed to technologies for providing live testing of applications based upon a debug keystore. Utilizing an implementation of the technologies described herein, a debug keystore may be used to generate a digital signature to sign an application developed for association with an application store in order to allow for live testing of the application with respect to various components of the application. In this way, live testing can occur without the need for publication and approval of the application by the application store. Additionally, use of the debug keystore may allow for live testing of the application to occur without the third-party developer incurring in-application purchase fees.

In order to enable the functionality disclosed briefly above, a third-party application developer registers with an application store. The third-party application developer generates a debug keystore and provides a public portion of the debug keystore to the application store. Alternatively, the application store generates the debug keystore and provides the debug keystore to the third-party application developer. The debug keystore can be used to identify the third-party application developer and indicates that any application signed using a digital signature that was generated with and includes the public portion of the debug keystore is being executed for live testing purposes, i.e. execution on production systems for the purpose of testing the application. Applications developed by the third-party application developer are thus signed with a digital signature based upon the public portion of the debug keystore. When such an application is submitted to the application store, the application store matches the public portion of the debug keystore with the public portion of the debug keystore at the application store and allows the application to be executed with respect to various components of the application store.

More particularly, a third-party application developer develops an application and signs the application with a digital signature based upon a public debug keystore of the application developer that identifies the application developer and identifies the application as being allowable for executing at the application even though the application is unpublished. The third-party application developer submits the application to an application store by attempting to execute the application with an application store execution application on an application developer system of the third-party application developer. The application store will recognize the application as being developed by the third-party application developer based upon the digital signature. The application store will also recognize that the digital signature includes the public debug keystore. The application store will allow the application to execute for live testing purposes without publishing and approval of the application for sale and execution by the application store, i.e. the application can execute as if a customer that purchases the "published" application is executing the application live at the application store.

Execution of the application for live testing can allow the application to attempt to perform in-application purchases ("IAP"). A subscription management service of the application store can offer an IAP item for purchase in order to test the IAP functionality of the application. Since such offers generally include a price, the offer for purchase may indicate that the price is zero, or may include the price with a strike-through (thereby indicating the third-party application developer will not be charged anything). The third-party application developer can then agree to purchase the IAP item and will not be charged since the application is merely being live tested. In a configuration, the price will be displayed with the offer for sale. The third-party application developer can still agree to purchase the IAP item and may not be charged since the application is merely being live tested by the application store.

Additionally, a digital rights management ("DRM") component of the application store can verify that DRM components of the application are functioning properly. The digital signature within the application can be used to verify that the application is properly configured to only operate based upon verification the digital signature of the application. In addition, based upon the live testing of the application, specific metrics based upon the live testing of the application may be provided too third-party application developer.

In configurations, the debug keystore may allow for beta-users of an application to execute the application for live testing of the application without incurring any application fees or IAP fees. Thus, the third-party application developer may provide the application, signed with the digital signal based upon the public portion of the debug keystore to a group of beta users to obtain live testing of the application at the application store.

The application may be signed with the digital signature manually by the third-party application developer. Alternatively, an integrated development environment ("IDE") used by the third-party application developer may automatically sign the application with the digital signature. Additional details regarding the various components and processes described briefly above for providing live testing of applications based upon a debug keystore will be presented below with regard to FIGS. 1-7.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a system architecture diagram showing aspects of the configuration and operation of several components described herein for providing live testing of applications based upon a debug keystore. As shown in FIG. 1, various computing systems 104 may be operated in a distributed network, such as service provider network 102, to provide an application store 108. An application store 108 is an electronic marketplace where customers can browse and purchase application programs, such as an application 112, for download and use on their own customer devices, such as the customer device 122. An application store 108 might offer applications for use on customer devices 122 such as smart phones, tablet computers, laptop or desktop computers, and/or other types of computing devices.

In order to provide the application store 108 and, potentially, the other functionality disclosed herein, the application store computing systems 104 might include one or more application servers. The application servers may execute a number of software components in order to provide the testing services described herein, including the live testing of applications based upon a debug keystore. The software components may execute on a single application server or in parallel across multiple application servers. In addition, each software component may consist of a number of subcomponents executing on different application servers or other virtual or physical computing resources. Various components may be implemented as software, hardware, or any combination of the two.

It should be appreciated that the application store computing systems 104 shown in FIG. 1 have been simplified for discussion purposes and that many additional software and hardware components may be utilized. In particular, the application store computing systems 104 might interoperate with many other computing systems in order to provide the application store 108. For example, the application store computing systems 104 might utilize a subscription management service 128 to manage subscriptions to content provided as in-application ("in-app") purchases ("IAP"). Additionally, the application store computing systems 104 may also utilize a digital rights management ("DRM") component 130 to manage digital rights. Other systems and/or services not shown in FIG. 1, such as billing systems, reporting systems, customer relationship management systems, and others might also be utilized.

A customer 120 of the application store 108 may use a customer device 122 to access the application store 108 through a network (not shown in FIG. 1), such as the Internet. A customer 120 may be an individual or entity that desires to browse, purchase, or has purchased, one or more applications from the application store 108. The customer device 122 may be a smartphone, personal computer ("PC"), desktop workstation, laptop computer, tablet computer, notebook computer, personal digital assistant ("PDA"), electronic-book reader, game console, set-top box, consumer electronics device, server computer, or any other type of computing device capable of connecting to a data communications network and communicating with the application store 108.

In some configurations, software components executing on the application store computing systems 104 provide functionality for permitting customers to browse and purchase applications 112 available from the application store 108. For instance, the application store 108 may receive a browse request from a customer device 122 and, in response thereto, retrieve information regarding a particular application 112 offered for sale from the application store 108 referenced by the browse request, generate or retrieve information describing the application, and transmit the information over a network to a client application (not shown in FIG. 1) executing on the customer device 122 for display to the customer 120. The application information may include a name of the application 112, the name of the application developer 110 that developed the application, a text description of the application 112, one or more images of the application 112 during execution, a price for the application 112, and/or other information. The application information might be stored in a suitable database or other type of data store maintained by the application store 108 for each application 112 offered for sale.

The network utilized to connect to the application store 108 might be a local-area network ("LAN"), a wide-area network ("WAN"), the Internet, or any other networking topology known in the art that connects a customer device 122 to the application store 108. A customer 120 may use a client application (not shown in FIG. 1) executing on the customer device 122 to access and utilize the functionality provided by the application store 108. The client application might be a Web browser or a stand-alone client application configured for communicating with the application store 108. The client application might also utilize any number of communication methods known in the art to communicate with the application store 108 across a network, including remote procedure calls, network service calls, remote file access, proprietary client-server architectures, and the like.

The application store 108 might also provide functionality for allowing an application developer 110 to submit an application 112 for inclusion in the application store 108. For example, and without limitation, the application store 108 may be configured to provide an application store developer portal 116 in some configurations. The application store developer portal 116 provides a Web-based interface through which an application developer 110 can create a new developer account in the application store 108, submit an application 112 for inclusion in the application store 108, and define application metadata 118 for the application 112, such as a description of the application 112, the price for the application, if any, and other information pertinent to the application 112.

The application metadata 118 can also include data defining in-application purchase items 126, such as available in-application purchase items for an application 112, purchase term, price, etc. An IAP item 126 is an item that a customer 120 can purchase from within an application 112. IAP items 126 can include, but are not limited to, subscriptions, consumables, and entitlements. An in-application subscription may be made to any type of content that carries an entitlement, is bound by a period of time, and may auto-renew at the end of the period. A consumable in-application purchase is content that is used within an application, such as perishable items like extra lives in a game or in-application currency. An entitlement is content that requires access rights to access, such as a purchased copy of an electronic magazine issue or the unlocking of a level in a game. It should be appreciated that these examples are merely illustrative and that an application developer might define metadata 118 for other types of in-application purchase items 126 in other configurations.

Once an application developer 110 has submitted an application 112 and associated application metadata 118 to the application store 108, the operator of the application store 108 might perform a process for approving the application 112 for inclusion in the application store 108. For example, various types of automated tests might be performed on the application. If the operator of the application store 108 approves the application 112 for inclusion in the application store 108, the application 108 will then be published, i.e., made available to customers 120. If the operator of the application store 108 does not approve the application 112 for inclusion in the application store 108, a notification might be transmitted to the application developer 110 indicating that the application 112 was denied and providing a reason for the denial.

In order to enable the functionality disclosed briefly above, an application developer 110 may register with the application store 108. In embodiments, such registration may include, or may be achieved, by the developer 110 providing a service provider network management console 132 with a public portion 134a of a debug keystore 134. Alternatively, the network management console 132 generates and provides the entire keystore, including the public portion 134a of the debug keystore and a private portion 134b of the keystore, to the application developer system 114 upon registration with the network management console 132. The debug keystore 134 identifies the application developer 110 and/or application developer system 114 and indicates that an application 112 signed using a digital signature 138 generated and including the public portion 134a of the debug keystore 134 is being executed for live testing purposes.

More particularly, the developer 110 may utilize the application developer system 114 to execute a program development environment 140 to develop an application 112. As known in the art, a program development environment 140 is an environment that allows a user to create, compile, and execute an application, such as the application 112. For example, in an embodiment disclosed herein, the program development environment 140 is the ECLIPSE integrated development environment ("IDE") from the ECLIPSE FOUNDATION. In another embodiment, the program development environment is the INTELLIJ IDEA IDE from JETBRAINS S.R.O. It should be appreciated, however, that other IDEs and other types of program development environments 140 from other vendors might also be utilized with the mechanisms disclosed herein. In embodiments, the program development environment 140 may generate the debug keystore 134.

Once the application developer 110 completes the application 112 using the program development environment 140, the application developer 110 generally wants to test the application for various problems prior to submission of the application 112 for approval and publication, which can take a long period of time. Such testing can include performing live testing of the application for various features such as, for example, IAP item 126 purchases and DRM compatibility. In other words, the live testing of the application 112 can include execution of the application 112 by the application developer system 114 in the same manner as if the application has been published and approved by the application store 108.

In accordance with embodiments, upon completion of the application 112, the application 112 is signed with a digital signature 138 that is generated with and includes the public portion 134b of the debug keystore. The application developer 110 may then submit the application 112 to the application store 108 by attempting to execute the application 112 using an application store execution application 142 on application developer system 114. The application store execution application 142 can obtain the application 112 and forward the application 112 to the application store 108, which will verify that the application 112 was developed by the application developer 110 based upon the digital signature 138. The application store 108 will also verify that the digital signature 138 includes the public portion 134a of the debug keystore by matching the public portion 134a of the debug keystore with the public portion 134b of the debug keystore on record with the application store 108. The application store 108 will then allow the application 112 to execute for live testing purposes without publishing and approval of the application 112 for sale and execution by the application store 108, i.e. the application can execute as if a customer that purchases the "published" application is executing the application live. If the public portion 134a of the debug keystore in the digital signature 138 does not match the public portion 134a of the debug keystore with the public portion 134b of the debug keystore on record with the application store 108 and the application 112 is not published and approved, then the application store 108 will not allow the application 112 to execute.

Execution of the application 112 for live testing can allow the application to attempt to purchase IAP items 126. The subscription management service 128 can offer an IAP item 126 for purchase in order to test the IAP functionality of the application 112. Since such offers generally include a price, the offer for purchase may indicate that the price is zero, or may include the price with a strike-through (thereby indicating the application developer 110 will not be charged anything). The application developer 110 can then agree to purchase the IAP item 126 and will not be charged since the application is merely being live tested. In a configuration, the actual price of the IAP item may be displayed with the offer for sale. The application developer 110 can still agree to purchase the IAP item 126 and may not be charged since the application 112 is merely being live tested by the application store 108.

In accordance with embodiments, the application store execution application 142 "brokers" IAP transactions and thus, a dialog window may be presented by the application store execution application 142 on a display of the application developer system 114. The dialog box may present the item and a price, displayed in a manner as described above, along with one or more graphic user interfaces ("GUI") that provides the option to buy the IAP item 126 or cancel the transaction.

Additionally, the DRM component 130 can verify that DRM components of the application 112 are functioning properly. The digital signature 138 within the application 112 can be used to skip an account check of the application 112 upon initial execution of the application 112, i.e. a user account may not be checked for authorization to execute the application 112. The DRM component 130 can thus verify that the application 112 is properly configured to only operate based upon verification of the digital signature 138 of the application 112.

In accordance with embodiments, the public portion 134a of the debug keystore may allow for customers 120 or other third parties to serve as "beta-users" of the application 112 to execute the application for live testing of the application 112 without incurring any application fees or IAP event 126 fees. Thus, the application developer 110 may provide the application 112, signed with the digital signature 138 generated and including the public portion 134a of the keystore, to one or more customers 110 to obtain live testing of the application 112 from the application store 108.

Based upon the live testing of the application 112, specific metrics and/or test results 144 related to the live testing of the application 112 may be provided to the application developer system 114 for the benefit of the application developer 110. The test results may include various aspects of the testing including, but not limited to, how many IAP items 126 were purchased, successes of attempted IAPB, failures of attempted IAPB, amount of time IAPB worked and did not work properly, DRM successes, DRM failures, etc. Additionally, the test results may indicate whether failures were caused by the application 112 or by customers or parties executing the application 12. If a third party is executing the application 112, the test results 144 may be provided directly to the application developer system 114 (based upon the public portion 134a of the digital signature 138) or to the third party for providing to the application developer system 114. Based upon the test results 144, the application developer 110 can modify the application 112 and then re-execute the application for live testing based upon the digital signature 138. Once the application 112 is operating properly, the application developer 110 can submit the application 112 from the application developer system 114 to the application store 108 for approval and publication of the application 112. A new digital signature 138 is generated without the public portion 134a of the debug keystore that can be used to sign the application 112. The new digital signature 138 identifies the application developer 110 and/or the application developer system 114. Once the application 112 with the new digital signature 138 is presented to the application store, copies of the application 112 that include the digital signature 138 generated with the public portion 134a of the debug keystore will no longer execute at the application store. Additionally, the application developer 110 may inform the network management console 132 to not validate or recognize the public portion 134a of the debug keystore for public testing.

In accordance with embodiments, the service provider network 102 is generally a distributed network system that is configured to provide virtual and/or physical computing resources, data storage, and/or other types of software services on a permanent or on-demand basis. Additional details regarding the configuration and operation of the service provider network 102 are provided below with regard to FIGS. 4-7. In this regard, it should be appreciated that while the application store 108 is also shown in FIG. 1 as being provided by computing systems 104 in the service provider network 102, the application store 108 might be provided by other systems external to the service provider network 102. Likewise, the subscription management service 128 and/or DRM component 130 and/or network management console 132 may be provided by computing systems 104 or may be provided by other systems external to the service provider network 102. Other configurations might also be utilized wherein the various services described herein are not provided by a service provider network 102. Other configurations will become apparent to those skilled in the art.

Figure 2:
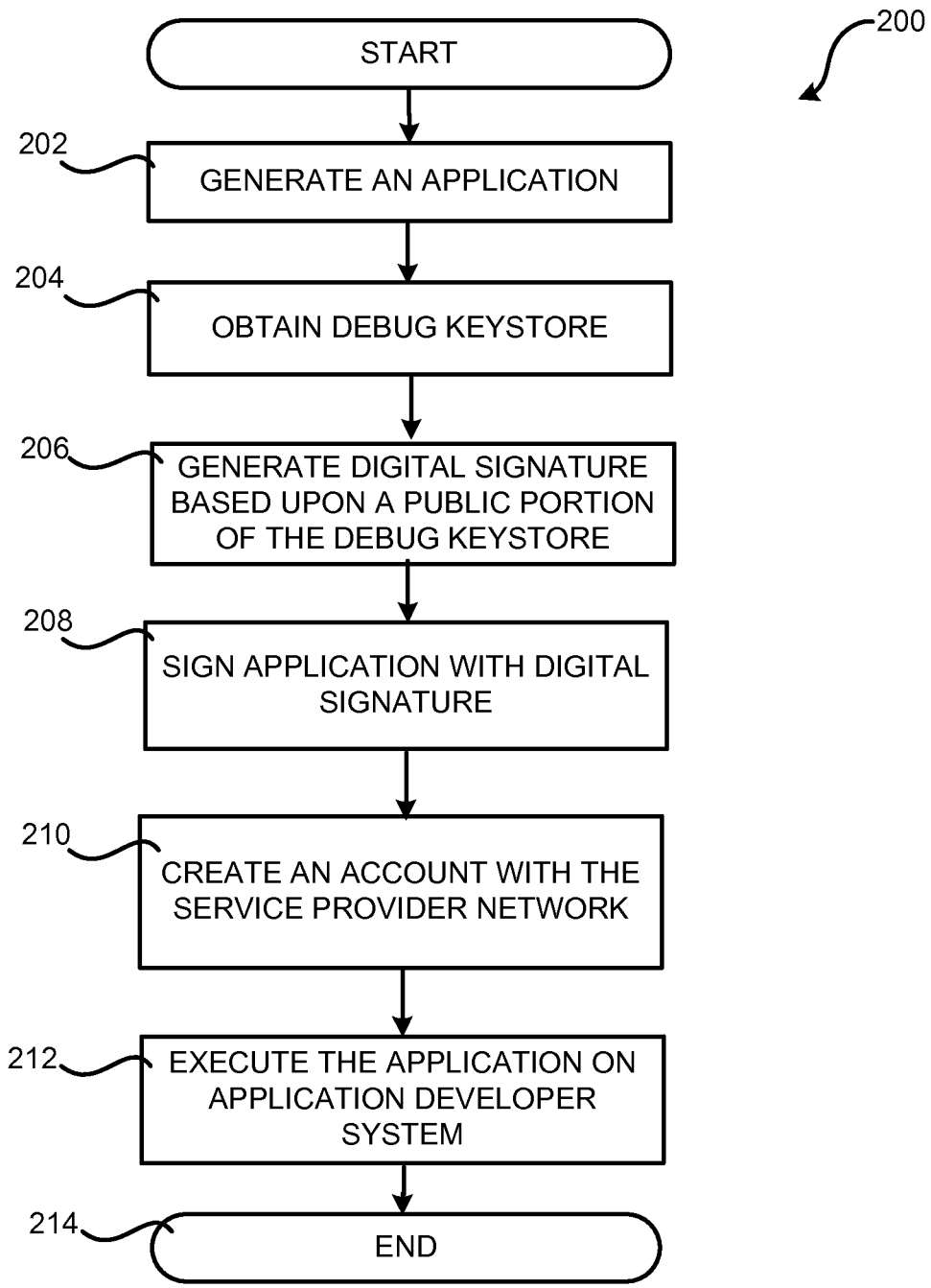
FIG. 2 is a flow diagram illustrating aspects of an illustrative routine disclosed herein for generating an application, by an application developer system, signed with a digital signature generated using a public portion of a debug keystore.

FIG. 2 is a flow diagram illustrating aspects of an illustrative routine 200 disclosed herein for generating an application 112, by an application developer system 114, signed with a digital signature 138 generated using a public portion 134a of a debug keystore in the manner described above. It should be appreciated that the logical operations described herein with respect to FIGS. 2 and 3, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 200 begins at operation 202, where an application developer 110 develops an application 112. At operation 204, a public portion 134a of a debug keystore is obtained. As discussed above, the public portion 134a of the debug keystore 134 may be generated by the program development environment 140 or may be provided to the program development environment 140 by the network management console 132.

Once the public portion 134a of the debug keystore is obtained, at operation 206 a digital signature 138 is generated. The digital signature 138 is generated based upon and includes the public portion 134a of the debug keystore. At operation 208, the application 112 is signed with the digital signature 138. As mentioned above, the application 112 may be signed manually by the application developer 110 or may be signed automatically by the program development environment 140.

At operation 210, the application developer 110 creates an account with the service provider network 102. As discussed above, such creation of an account, i.e. registration, may include, or may be achieved, by the application developer 110 providing the service provider network management console 132 with the public portion 134a of a debug keystore. Alternatively, the network management console 132 provides the public portion 134a of the debug keystore to the application developer system 114 upon registration with the network management console 132.

Upon registration, at operation 212, the application 112 is executed by the application developer 110 using the application developer system 114. As mentioned above, the application 112 is executed using the application store execution application 142. By using a digital signature 138 that includes the public portion 134a of the debug keystore, live testing of the application 112 can occur without the need for publication and approval of the application 112 by the application store 108. Additionally, use of the public portion 134a of the debug keystore may allow for live testing of the application 112 to occur without the developer 110 incurring IAP event 126 fees. From operation 212, the routine 200 proceeds to operation 214, where it ends.

Figure 3:
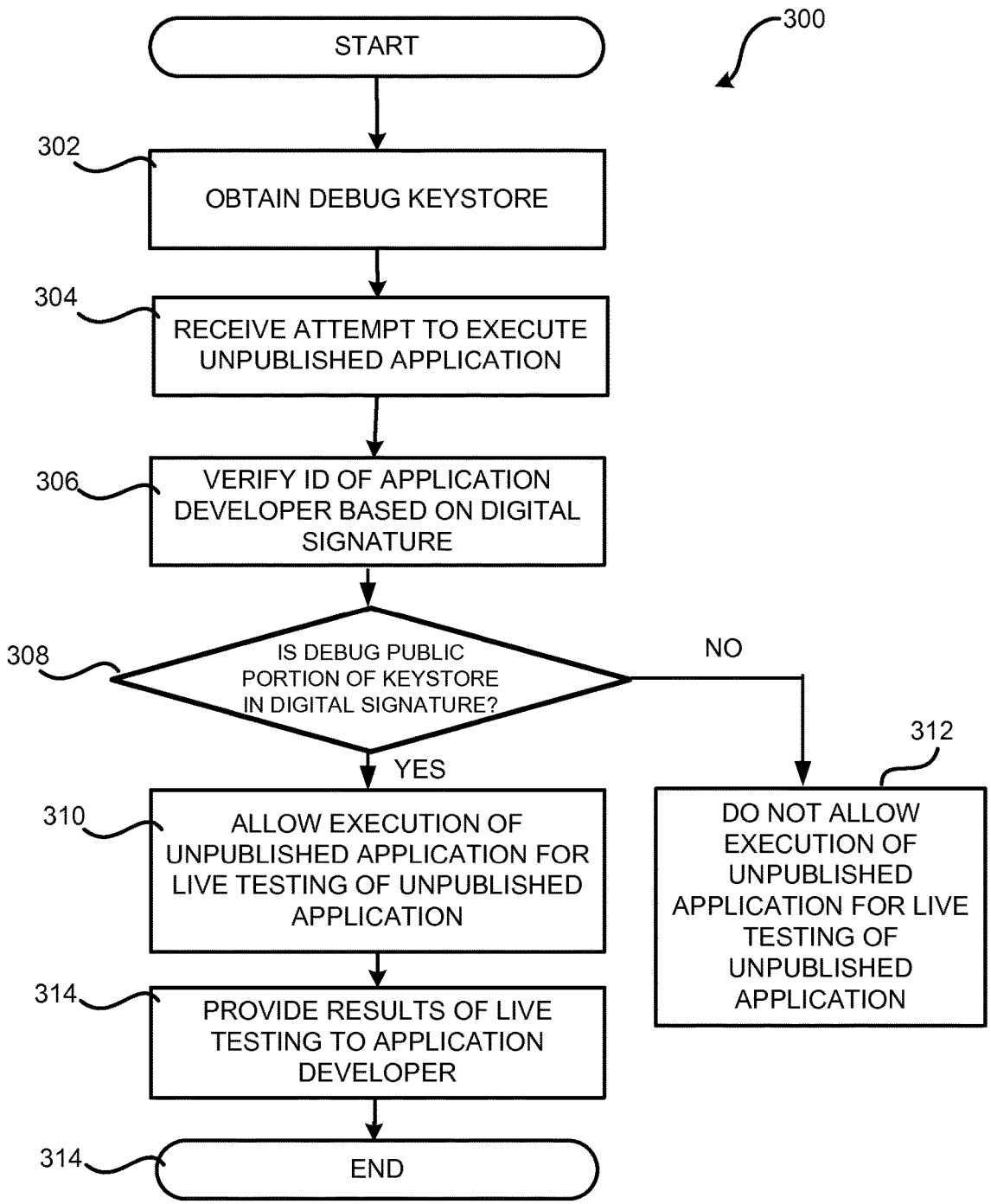
FIG. 3 is a flow diagram illustrating aspects of an illustrative routine disclosed herein for providing live testing of applications based upon a debug keystore.

FIG. 3 is a flow diagram that illustrates aspects of an illustrative routine 300 disclosed herein for providing live testing of unpublished applications based upon a public portion of a debug keystore 134a. The routine 300 begins at operation 302, where the application store 108 obtains a public portion 134a of a debug keystore. As discussed above, the public portion 134a of the debug keystore may be generated by the program development environment 140 or may be provided to the program development environment 140 by the network management console 132. At operation 304, the application store 108 receives an attempt to execute an unpublished application 112.

At operation 306, the application store 108 verifies the identification of the application developer 110 based upon a digital signature 138 of the unpublished application 112. The digital signature 138 is generated based upon and includes the public portion 134a of the debug keystore. At operation 308, the application store 108 if the digital signature 138 includes the public portion 134a of the debug keystore.

In response to verifying the identification of the application developer 110 and if the public portion 134a of the debug keystore is included in the digital signature 138, at operation 310 the application store 108 allows execution of the application 112 for live testing purposes. The application store 108 attempts to match the public portion 134a of the keystore in the digital signature 138 with a public portion of a keystore at the application store 108. If the public portion 134a of the debug keystore is not included in the digital signature 138, then at operation 312 the application store 108 does not allow execution of the application 112 for live testing purposes. Execution of the application 112 for live testing can allow the unpublished application 112 to attempt to purchase IAP items 126. The subscription management service 128 can offer an IAP item 126 for purchase in order to test the IAP functionality of the unpublished application 112. Since the unpublished application 112 is being executed for live testing purposes, the application store 108 may not charge the application developer 108 for transactions involving the purchase of IAP items 126. Additionally, as discussed above, the DRM component 130 can verify that DRM components of the unpublished application 112 are functioning properly.

Upon completion of the live testing of the unpublished application 112, test results 144 may be generated. At operation 314, the test results 144 may be provided to the application developer 110. From operation 314, the routine 300 proceeds to operation 316, where it ends.

Figure 4:
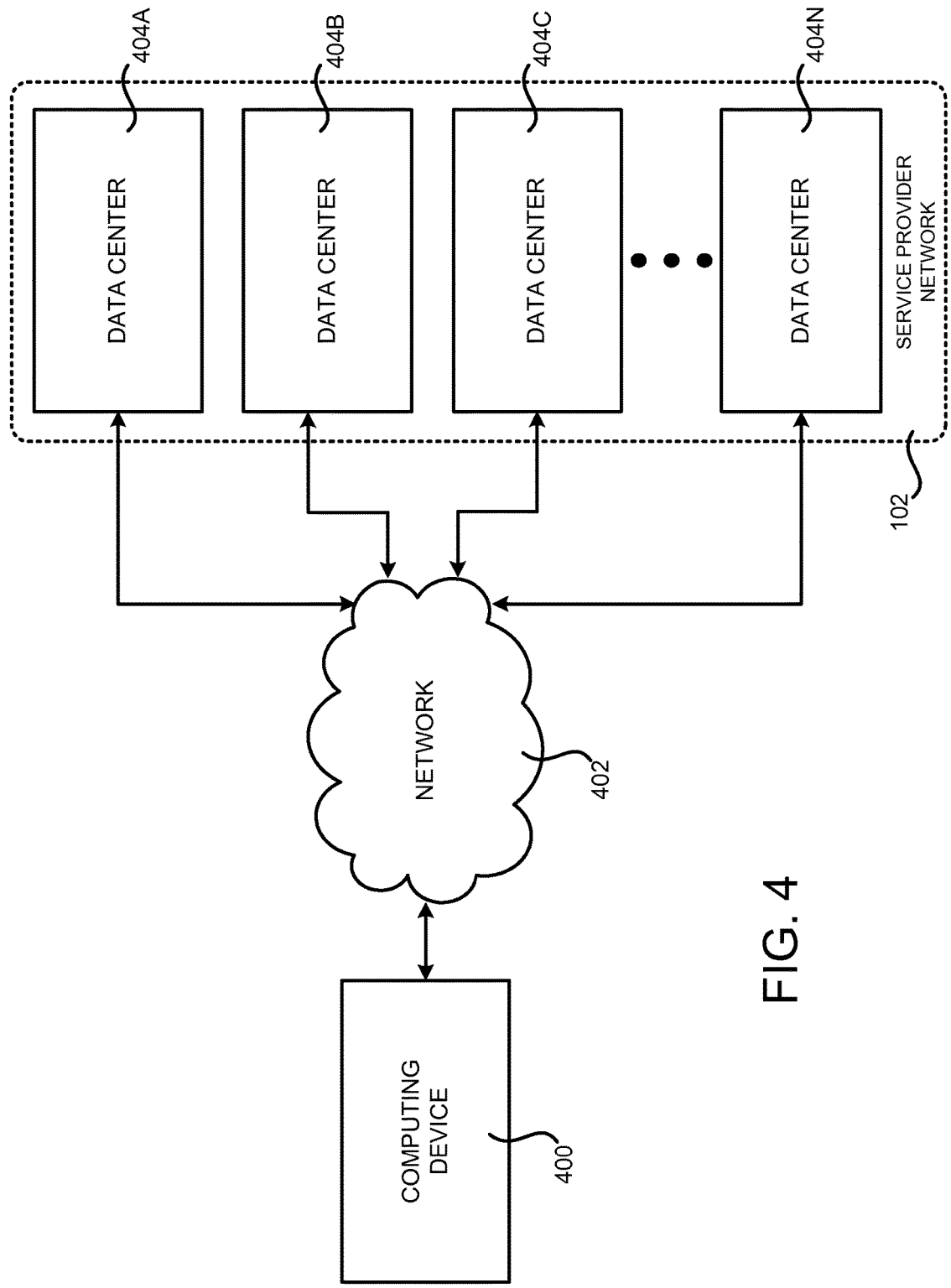
FIG. 4 is a system and network diagram that shows an illustrative operating environment that includes a service provider network that may be configured to implement aspects of the functionality described herein.

FIG. 4 is a system and network diagram that shows one illustrative operating environment for the configurations disclosed herein that includes a service provider network 102 that may be configured to provide providing live testing of applications 112 based upon a public portion 134a of debug keystore in the manner described above, according to one configuration disclosed herein. As discussed above, the service provider network 102 can provide computing resources on a permanent or an as-needed basis. Among other types of functionality, the computing resources provided by the service provider network 102 can be utilized to execute the various services described above. The computing resources provided by the service provider network 102 may include various types of computing resources, such as data processing resources, data storage resources, networking resources, data communication resources, network services, and the like.

Each type of computing resource provided by the service provider network 102 may be general-purpose or may be available in a number of specific configurations. For example, data processing resources may be available as physical computers or virtual machine instances in a number of different configurations. The virtual machine instances may be configured to execute applications, including Web servers, application servers, media servers, database servers, some or all of the services described above, and/or other types of programs. Data storage resources may include file storage devices, block storage devices, and the like. The service provider network 102 might also be configured to provide other types of resources and network services.

The computing resources provided by the service provider network 102 are enabled in one implementation by one or more data centers 404A-404N (which may be referred herein singularly as "a data center 404" or in the plural as "the data centers 404"). The data centers 404 are facilities utilized to house and operate computer systems and associated components. The data centers 404 typically include redundant and backup power, communications, cooling, and security systems. The data centers 404 might also be located in geographically disparate locations. One illustrative configuration for a data center 404 that implements some of the technologies disclosed herein for providing live testing of applications 112 based upon a public portion 134a of a debug keystore will be described below with regard to FIG. 5.

The customers and other users of the service provider network 102 may access the computing resources provided by the service provider network 102 over a network 402, which may be a wide area communication network ("WAN"), such as the Internet, an intranet or an Internet service provider ("ISP") network or a combination of such networks. For example, and without limitation, a computing device 400 operated by a customer or other user of the service provider network 102 might be utilized to access the service provider network 102 by way of the network 402. It should be appreciated that a local-area network ("LAN"), the Internet, or any other networking topology known in the art that connects the data centers 404 to remote customers and other users may be utilized. It should also be appreciated that combinations of such networks might also be utilized.

Figure 5:
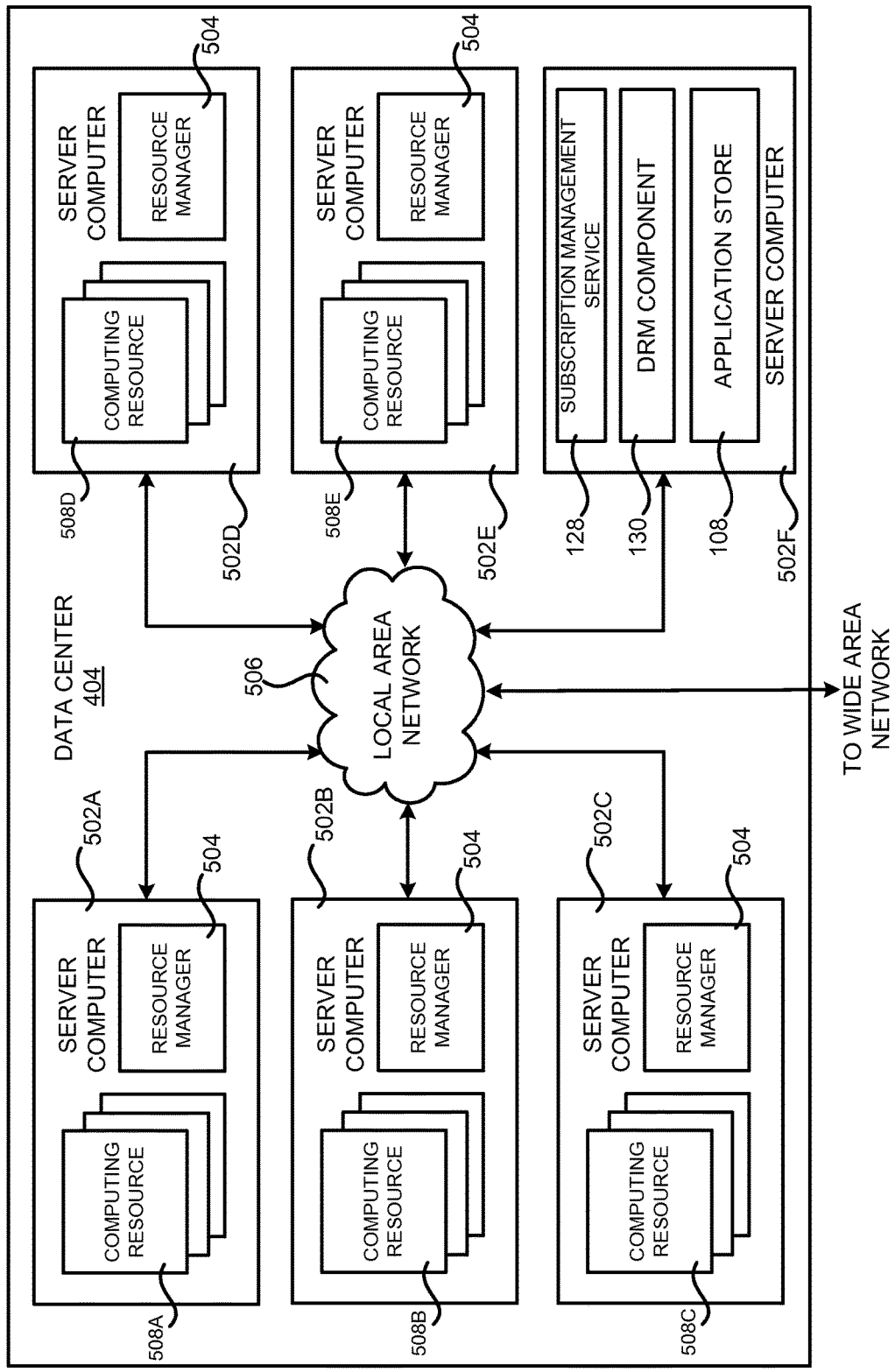
FIG. 5 is a computing system diagram that illustrates a configuration for a data center that may be utilized to implement aspects of the technologies disclosed herein.

FIG. 5 is a computing system diagram that illustrates one configuration for a data center 404 that implements aspects of the concepts and technologies disclosed herein for providing live testing of applications 112 based upon a public portion 134a of a debug keystore. The example data center 404 shown in FIG. 5 includes several server computers 502A-502F (which may be referred to herein singularly as "a server computer 502" or in the plural as "the server computers 502") for providing computing resources 508A-508E.

The server computers 502 may be standard tower, rackmount, or blade server computers configured appropriately for providing the computing resources described herein. As mentioned above, the computing resources might be data processing resources such as virtual machine instances or hardware computing systems, data storage resources, database resources, networking resources, and others. Some of the servers 502 might also be configured to execute a resource manager 504 capable of instantiating and/or managing the computing resources. In the case of virtual machine instances, for example, the resource manager 504 might be a hypervisor or another type of program configured to enable the execution of multiple virtual machine instances on a single server 502. Server computers 502 in the data center 404 might also be configured to provide network services and other types of services, some of which are described in detail below with regard to FIG. 5.

The data center 404 shown in FIG. 5 also includes a server computer 502F that may execute some or all of the software components described above. For example, and without limitation, the server computer 502F might be configured to execute the one or more of the subscription management service 128, the DRM component 130, and/or software components for providing the application store 108, each of which has been described in detail above. The server computer 502F might also be configured to execute other components and/or to store data for providing some or all of the functionality described herein. In this regard, it should be appreciated that the services illustrated in FIG. 5 as executing on the server computer 502F might execute on many other physical or virtual servers in the data centers 404 in various configurations.

In the example data center 404 shown in FIG. 5, an appropriate LAN 506 is also utilized to interconnect the server computers 502A-502F. The LAN 506 is also connected to the network 402 illustrated in FIG. 5. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 404A-404N, between each of the server computers 502A-502F in each data center 404, and, potentially, between computing resources in each of the data centers 404. It should be appreciated that the configuration of the data center 404 described with reference to FIG. 5 is merely illustrative and that other implementations might be utilized.

Figure 6:
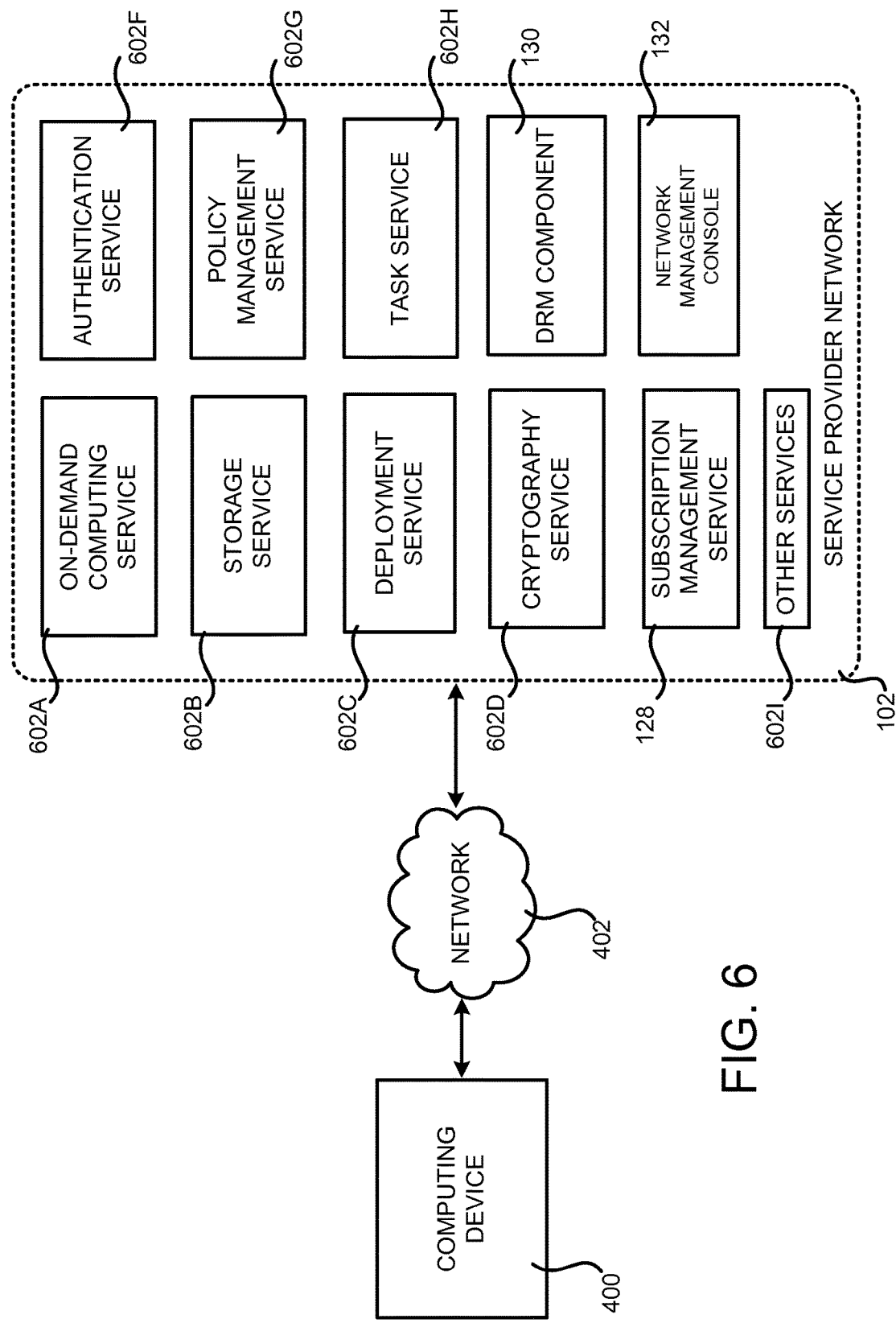
FIG. 6 is a system and network diagram that shows aspects of several services that might be provided by and utilized within a service provider network in one configuration disclosed herein.

FIG. 6 is a system and network diagram that shows aspects of several network services that might be provided by and utilized within a service provider network 102 in one configuration disclosed herein. In particular, and as discussed briefly above, the service provider network 102 may provide a variety of network services to customers and other users of the service provider network 102 including, but not limited to, an on-demand computing service 602A, a storage service 602B, a deployment service 602C, a cryptography service 602D, an authentication service 602F, a policy management service 602G, and/or a task service 602H, each of which is described in greater detail below. Additionally, the service provider network 102 might also provide the subscription management service 128, the DRM component 130 and the network management console 132, each of which was described in detail above. The service provider network 102 might also provide other services 602I, some of which are described in greater detail below.

It should be appreciated that customers of the service provider network 102 may include organizations or individuals that utilize some or all of the services provided by the service provider network 102. As shown in FIG. 6, a customer or other user may communicate with the service provider network 102 through the network 402. Communications from the computing device 400 to the service provider network 102 may cause the services provided by the service provider network 102 to operate in accordance with the described configurations or variations thereof.

It is noted that not all configurations described include the services described with reference to FIG. 6 and that additional services may be provided in addition to or as an alternative to services explicitly described. Each of the services shown in FIG. 6 might also expose web service interfaces that enable a caller to submit appropriately configured API calls to the various services through web service requests. In addition, each of the services may include service interfaces that enable the services to access each other (e.g., to enable a virtual computer system provided by the on-demand computing service 602A to store data in or retrieve data from the data storage service 602B). Additional details regarding some of the services shown in FIG. 6 will now be provided.

The on-demand computing service 602A may be a collection of computing resources configured to instantiate virtual machine instances. For example, a customer or other user of the service provider network 602A may interact with the on-demand computing service 602A (via appropriately configured and authenticated API calls) to provision and operate virtual computer systems that are instantiated on physical computing devices hosted and operated by the service provider network 102. The virtual computer systems may be used for various purposes, such as to operate as servers supporting a website, to operate business applications or, generally, to serve as computing resources for the customer. Other applications for the virtual computer systems may be to support database applications, electronic commerce applications, business applications and/or other applications. Although the on-demand computing service 602A is shown in FIG. 6, any other computer system or computer system service may be utilized in the service provider network 102, such as a computer system or computer system service that does not employ virtualization and instead provisions computing resources on dedicated or shared computers/servers and/or other physical devices.

In some configurations, the on-demand computing service 602A is configured to provide clusters of computing resources. For example, and without limitation, the on-demand computing service 602A might provide clusters of virtual or physical hosts for executing services such as those described above. According to one configuration, computing clusters provided by the on-demand computing service 602A might be organized as an APACHE™ HADOOP® computing cluster specialized for deployment alongside, or within, the service provider network 102. It should be appreciated that other variations and implementations of computing clusters are possible. Thus, the present disclosure should not be limited to only these examples, but should be interpreted as including any equivalent variations as well.

The storage service 602B might include software and computing resources that collectively operate to store data using block or file-level storage devices (and/or virtualizations thereof). The storage devices of the storage service 602B might, for instance, be operationally attached to virtual computer systems provided by the on-demand computing service 602A to serve as logical units (e.g., virtual drives) for the computer systems. A storage device might also enable the persistent storage of data used/generated by a corresponding virtual computer system where the virtual computer system service might only provide ephemeral data storage.

The service provider network 102 may also include a cryptography service 602D. The cryptography service 602D may utilize storage services of the service provider network 102, such as the storage service 602B, to store encryption keys in encrypted form, whereby the keys may be usable to decrypt customer keys accessible only to particular devices of the cryptography service 602D. The cryptography service 602D might also provide other types of functionality not specifically mentioned herein.

As discussed above, the service provider network 102 might also provide the subscription management service 128 in some configurations. As discussed above, the subscription management service 128 may comprise a collection of computing resources collectively configured to provide a web service or other interface and an associated browser-based management console, such as the service provider network management console 132. The management console 132 can be used to configure applications (or people), subscribe clients to topics, publish messages, or configure delivery of the messages over clients' protocol of choice (i.e., HTTP), e-mail and short message service ("SMS"), other types of push mechanisms, including mechanisms for pushing notifications to mobile devices, and others. The management console 132 may further be used for various purposes such as monitoring applications executing in the on-demand computing service 602A, workflow systems, time-sensitive information updates, mobile applications, and many others.

As illustrated in FIG. 6, the service provider network 102, in various configurations, also includes an authentication service 602F and a policy management service 602G. The authentication service 602F, in one example, is a computer system (i.e., collection of computing resources) configured to perform operations involved in authentication of users. For instance, one of the services 602 shown in FIG. 6 may provide information from a user to the authentication service 602F to receive information in return that indicates whether or not the requests submitted by the user are authentic.

The policy management service 602G, in one example, is a network service configured to manage policies on behalf of customers or internal users of the service provider network 102. The policy management service 602G may include an interface that enables customers to submit requests related to the management of policy. Such requests may, for instance, be requests to add, delete, change or otherwise modify policy for a customer, service, or system, or for other administrative actions, such as providing an inventory of existing policies and the like.

The service provider network 102, in various configurations, is also configured with a task service 602H. The task service 602H is configured to receive a task package and to enable executing tasks as dictated by the task package. The task service 602H may be configured to use any resource of the service provider network 102, such as instantiated virtual machines or virtual hosts, for executing the task. The task service 602H may configure the instantiated virtual machines or virtual hosts to operate using a selected operating system and/or a selected execution application in accordance with specified requirements.

The service provider network 102 may additionally maintain other services 602 based, at least in part, on the needs of its customers. For instance, the service provider network 102 may maintain a deployment service 602C for deploying program code and/or a database service (not shown in FIG. 6) in some configurations. A database service may be a collection of computing resources that collectively operate to create, maintain, and allow queries to be performed on databases stored within the service provider network 102. For example, a customer or other user of the service provider network 102 may operate and manage a database from the database service by utilizing appropriately configured network API calls. This, in turn, may allow the customer to maintain and potentially scale the operations in the database. Other services include object-level archival data storage services, and services that manage, monitor, interact with, or support other services. For example, subscription management service 128 might be provided to assist the application store 108 with the management of in-application subscriptions to content. The service provider network 102 might also be configured with other services not specifically mentioned herein in other configurations.

Figure 7:
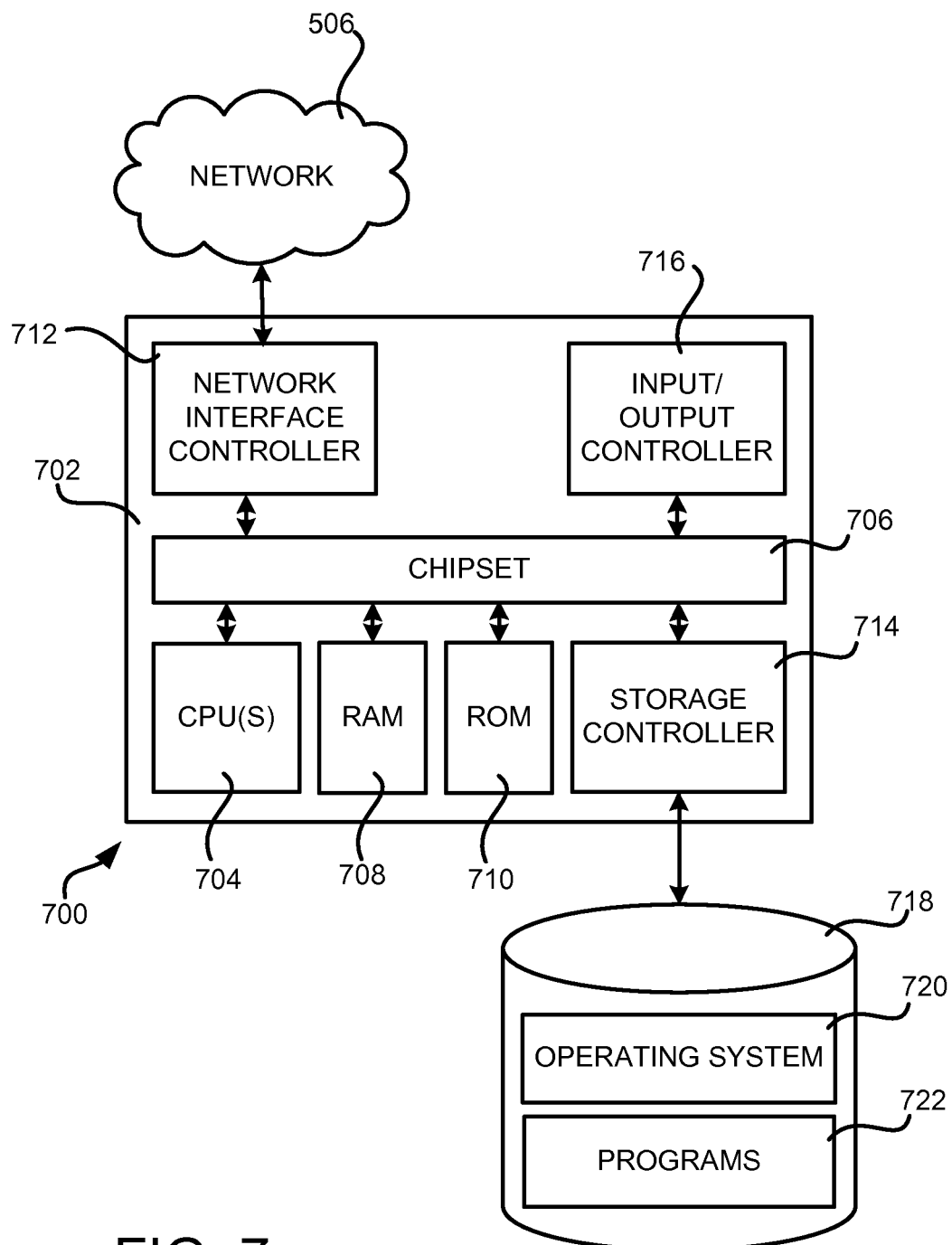
FIG. 7 is a computer architecture diagram showing an illustrative computer hardware architecture for implementing a computing device that might be utilized to implement aspects of the various technologies presented herein.

FIG. 7 shows an example computer architecture for a computer 700 capable of executing program components for implementing various aspects of the functionality described above. The computer architecture shown in FIG. 7 illustrates a conventional server computer, workstation, desktop computer, laptop, tablet, network appliance, e-reader, smartphone, or other computing device, and may be utilized to execute any of the software components presented herein. For example, the computer architecture shown in FIG. 7 may be utilized to execute software components for providing live testing of applications based upon a debug keystore in the manner described above.

The computer 700 includes a baseboard 702, or "motherboard," which is a printed circuit board to which a multitude of components or devices may be connected by way of a system bus or other electrical communication paths. In one illustrative configuration, one or more central processing units ("CPUs") 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network, such as the network 506. The chipset 706 may include functionality for providing network connectivity through a NIC 712, such as a gigabit Ethernet adapter. The NIC 712 is capable of connecting the computer 700 to other computing devices over the network 506. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store an operating system 720, programs 722, and data, which have been described in greater detail herein. The mass storage device 718 may be connected to the computer 700 through a storage controller 714 connected to the chipset 706. The mass storage device 718 may consist of one or more physical storage units. The storage controller 714 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage, and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 may store an operating system 720 utilized to control the operation of the computer 700. According to one configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 718 may store other system or application programs and data utilized by the computer 700.

In one configuration, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various processes described above with regard to FIGS. 1-3. The computer 700 might also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, an input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for providing live testing of applications based upon a debug keystore have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. An apparatus for providing live testing of an unpublished application, the apparatus comprising:
    a processor; and
    a non-transitory computer-readable storage medium having instructions stored thereupon which are executable by the processor and which, when executed, cause the apparatus to
        obtain a public portion of a debug keystore, wherein the public portion of the debug keystore identifies at least one of a developer or an application developer system,
        receive an unpublished application for execution, wherein the unpublished application is signed with a digital signature that is based upon and includes the public portion of the debug keystore, and wherein the public portion of the debug keystore further indicates that the unpublished application is being executed for live testing purposes,
        determine that the digital signature includes the public portion of the debug keystore,
        determine an identity associated with the unpublished application based upon the digital signature,
        based upon the public portion of the debug keystore, allow execution of the unpublished application for live testing, wherein execution of the unpublished application comprises providing in-application purchases without a monetary cost to the developer,
        determine that verification of the digital signature is required for non-testing operation of the unpublished application,
        generate test results related to the live testing, and
        provide the test results to the developer.

2. The apparatus of claim 1, wherein determine that verification of the digital signature is required for non-testing operation of the unpublished application comprises upon initial execution of the unpublished application for live testing, skipping a check of a user account associated with the unpublished application for authorization to execute the unpublished application.

3. The apparatus of claim 1, wherein the public portion of the debug keystore is obtained from the developer.

4. The apparatus of claim 1, wherein the debug keystore is generated by the apparatus and provided to the developer.

5. A system comprising one or more non-transitory computer-readable storage media having computer-executable instructions stored thereupon which, when executed by a computer, cause the computer to:
    receive an unpublished application for execution, wherein the unpublished application is signed with a digital signature based upon a public portion of a debug keystore, wherein the public portion of the debug keystore is associated with at least one of a developer account or an application developer system;
    determine, based at least in part on the public portion of the debug keystore, that the unpublished application is being executed for live testing purposes;
    determine that the digital signature includes the public portion of the debug keystore;
    determine an identity associated with the unpublished application based upon the digital signature;
    based upon the public portion of the debug keystore, allow execution of the unpublished application for live testing; and
    determine that verification of the digital signature is required for non-testing operation of the unpublished application.

6. The system of claim 5, wherein allowing execution of the unpublished application comprises:
    providing in-application purchases without a monetary cost to the developer account.

7. The system of claim 5, wherein determine that verification of the digital signature is required for non-testing operation of the unpublished application comprises:
    upon initial execution of the unpublished application for live testing, skipping a check of a user account associated with the unpublished application for authorization to execute the unpublished application.

8. The system of claim 5, wherein the public portion of the debug keystore is obtained from the developer account.

9. The system of claim 5, wherein the debug keystore is generated by the computer and provided to the developer account.

10. The system of claim 7, wherein the one or more non-transitory computer-readable storage media have further instructions stored thereupon to:
    generate test results related to the live testing; and
    provide the test results to the developer account.

11. The system of claim 10, wherein the test results comprise one or more of in-application purchase failures, in-application purchase successes, digital rights management failures or digital rights management successes.

12. The system of claim 5, wherein allowing execution of the unpublished application comprises:
    providing in-application purchases without a monetary cost to third parties.

13. A computer-implemented method, comprising:
    receiving an unpublished application for execution, wherein the unpublished application is signed with a digital signature based upon a public portion of a debug keystore, wherein the public portion of the debug keystore is associated with at least one of a developer account or an application developer system determining, based at least in part on the public portion of the debug keystore, that the unpublished application is being executed for live testing purposes;

determining that the digital signature includes the public portion of the debug keystore;

determining an identity associated with the unpublished application based upon the digital signature;

based upon the public portion of the debug keystore, executing the unpublished application for live testing; and determining that verification of the digital signature is required for non-testing operation of the unpublished application.

14. The computer-implemented method of claim 13, wherein executing the unpublished application comprises:

providing in-application purchases without a monetary cost to the developer account.

15. The computer-implemented method of claim 13, wherein determining that verification of the digital signature is required for non-testing operation of the unpublished application comprises:

upon initial execution of the unpublished application for live testing, skipping a check of a user account associated with the unpublished application for authorization to execute the application.

16. The computer-implemented method of claim 13, further comprising:

obtaining the public portion of the debug keystore from the developer account.

17. The computer-implemented method of claim 13, further comprising:

generating the debug keystore; and providing the debug keystore to the developer account.

18. The computer-implemented method of claim 13, further comprising:

generating test results related to the live testing; and providing the test results to the developer account.

19. The computer-implemented method of claim 18, wherein the test results comprise one or more of in-application purchase failures, in-application purchase successes, digital rights management failures or digital rights management successes.

20. The computer-implemented method of claim 13, wherein executing the unpublished application comprises:

providing in-application purchases without a monetary cost to third parties.

* * * * *